United States Patent
Bernard et al.

(10) Patent No.: US 9,092,775 B2
(45) Date of Patent: Jul. 28, 2015

(54) LOADING AND UPDATING AN APPLICATION REQUIRING PERSONALIZATION

(75) Inventors: Eddy Bernard, Munich (DE); Lucas Neubauer, Munich (DE); Joachim Monch, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 611 days.

(21) Appl. No.: 13/054,984

(22) PCT Filed: Jun. 18, 2009

(86) PCT No.: PCT/EP2009/004408
§ 371 (c)(1),
(2), (4) Date: Jan. 20, 2011

(87) PCT Pub. No.: WO2010/009789
PCT Pub. Date: Jan. 28, 2010

(65) Prior Publication Data
US 2011/0126183 A1    May 26, 2011

(30) Foreign Application Priority Data
Jul. 21, 2008  (DE) .......................... 10 2008 033 976

(51) Int. Cl.
G06F 9/44 (2006.01)
G06Q 20/34 (2012.01)
G06F 9/445 (2006.01)
G07F 7/10 (2006.01)

(52) U.S. Cl.
CPC .............. G06Q 20/3552 (2013.01); G06F 8/65 (2013.01); G07F 7/1008 (2013.01)

(58) Field of Classification Search
None
See application file for complete search history.

(56) References Cited

U.S. PATENT DOCUMENTS

| | | | |
|---|---|---|---|
| 6,005,942 A * | 12/1999 | Chan et al. | ..................... 713/187 |
| 2001/0032885 A1 | 10/2001 | Groeger | |
| 2008/0162715 A1 | 7/2008 | Wary | |

FOREIGN PATENT DOCUMENTS

| | | |
|---|---|---|
| CN | 101212753 A | 7/2008 |
| DE | 19634064 | 2/1998 |
| EP | 1936574 | 6/2008 |
| GB | 2358500 | 7/2001 |

OTHER PUBLICATIONS

Rankl, W. et al., "The Smart Card Life Cycle", Smart Card Handbook, pp. 630-650, Aug. 20, 2002.
International Search Report in PCT/EP2009/004408, Sep. 23, 2009.

* cited by examiner

*Primary Examiner* — Qamrun Nahar
(74) *Attorney, Agent, or Firm* — Workman Nydegger

(57) ABSTRACT

The invention provides a method for loading an application requiring personalization into a portable storage medium which is set up to be operated in a terminal. Personalization data for personalizing the application and possibly application data are additionally loaded into a restore module which is independent of applications stored in an application memory, is configured as a non-volatile memory, and is disposed within the portable storage medium or within the terminal. For updating an application, the personalization data and possibly application data are loaded from the restore module into the updated application. A portable storage medium has a non-volatile, application-independent restore module. System with storage medium and terminal and non-volatile, application-independent restore module.

17 Claims, 2 Drawing Sheets

LOADING AND UPDATING AN APPLICATION REQUIRING PERSONALIZATION

BACKGROUND

1. Field

The invention relates to a method for loading an application requiring personalization into a portable storage medium, a method for updating an application stored in a portable storage medium, as well as a portable storage medium and a system.

2. Related Art

Portable storage media are used for keeping available applications for different areas of use. The portable storage medium has an application memory and a memory management unit, e.g. a memory controller, by which the application memory is managed. Selectively, the storage medium has a microprocessor, the task of the memory management being selectively carried out by the microprocessor. Examples of such portable storage media are smart cards equipped with a microprocessor and memory cards equipped with a memory controller. When using the portable storage medium in the mobile phone sector, the portable storage medium can be configured for example as a smart card having a security module for using a terminal (e.g. mobile phone) in a mobile phone network or be integrated in such a smart card. The smart card is for example a SIM card for the GSM system or a USIM card for the UMTS system or a similar smart card. Selectively, the portable storage medium is configured as a pay TV card for using pay TV or integrated in such a pay TV card. Selectively, the portable storage medium is a smart card integrated in a secure flash card, the secure flash card having a flash controller higher ranking than the smart card.

The portable storage medium can be read-out and written into by means of a terminal. As a terminal there is provided for example a mobile terminal for a mobile phone network, e.g. a mobile phone, PDA, smart phone, etc, or a set top box for pay TV (Pay TV) is provided. In the case of a portable storage medium, which is configured as a smart card integrated in a secure flash card, as a terminal there can be provided a flash controller, or alternatively a mobile terminal such as e.g. mobile phone, etc, PDA or smart phone.

An application for a portable storage medium normally must be personalized to the user of the application. The application first is unpersonalized, e.g. anonymous, and therefore identical and usable for each potential user. Not until upon the personalization, the initially anonymous application is made unique with personalization data for the user. The personalization data comprise for example personal identity data relating to the user and device data of a device for using the storage medium and are at least partly required so that the application can be used on the storage medium. For the personalization, first, the application is made available in an unpersonalized form. Subsequently, the personalization data are loaded into the application and the application is thus personalized.

Changes of the application at the application's manufacturer or provider require that from time to time an updated application is loaded into the portable storage medium. An updated application is made available, for example, in order to correct errors of the application, or to provide the user with additional or modified services of the application.

Conventionally, for updating an application, the updated application, which too is unpersonalized first, and the personalization data for personalizing the application are loaded from a server of the manufacturer or provider via a server-side connection into the portable storage medium. With the conventional method for updating the application it is necessary that upon each loading of an updated application the personalization data must be available at the manufacturer or provider of the application, so that they can be loaded again into the storage medium. Because of this, conventional application updates mean a high administration effort for the manufacturer or provider of the application. In addition, upon each application update the personalization data have to be loaded via the server-side connection. As the costs of the server-side connection often rise with transmitted data amount and/or duration of the connection, the personalization data, which have to be transmitted again upon each update, might cause additional costs for the manufacturer or provider of the application and for the user of the storage medium. The costs of the server-side connection, especially in the case of application updates over the air (OTA), i.e., if there is used a (mobile) radio connection as a server-side connection, can even be of a significant amount. Another risk upon the transmission of personalization data via a server-side connection is that personalization data are strictly confidential and can be intercepted upon any server-side transmission. Upon a personalization of an application loaded for the first time in the secure environment of the manufacturer of the storage medium ("pre-issuance"), the risk of the personalization data being intercepted upon the server-side connection may still be acceptable. Upon the loading of updated applications after the issuance of the storage medium by the manufacturer ("post-issuance"), however, the risk of personalization data being intercepted upon the server-side connection is great.

EP 1 936 574 A1 describes a loading of a Java card application requiring personalization into a Java card. An application and personalization data for personalizing the application are jointly loaded in one packet into the Java card here. The application is installed in the Java card and then the installed application is personalized with the personalization data from the packet.

SUMMARY OF THE DISCLOSURE

It is the object of the invention to provide an efficient, cost effective and at the same time secure method for loading an application requiring personalization into a portable storage medium as well as a method for updating an application stored in a portable storage medium. A corresponding portable storage medium and system having storage medium and terminal are also to be stated.

The object is achieved by a loading method according to the independent claim 1. Further, there are stated an update method, a portable storage medium and a system having a portable storage medium and a terminal. Advantageous embodiments of the invention are stated in the dependent claims.

In accordance with a preferred embodiment of the invention, a method for loading an application requiring personalization into a portable storage medium which is set up to be operated in a terminal, includes:

the application and personalization data are made available in a server disposed outside the storage medium and outside the terminal, said server being connectible with the portable storage medium and/or the terminal via a server-side connection for a transmission of applications and personalization data, the application is loaded at least partly via the server-side connection into an application memory of the storage medium, the personalization data are loaded into the application in such a way that the application is personalized with the personalization data, and the personalization data are loaded into a restore module which is independent of applications stored in the application memory, is configured as a non-volatile memory, and is disposed within the portable storage medium or within the terminal.

the personalization data are loaded into the application in such a way that the application is personalized with the personalization data, and the personalization data are loaded into a restore module which is independent of applications stored in the application memory, is configured as a non-volatile memory, and is disposed within the portable storage medium or within the terminal.

The personalization data, additionally to its loading into the application, is at least partly loaded into a restore module independent of the application and possibly further applications, and stored there in a non-volatile manner. By the personalization data being kept available in the restore module in the storage medium or terminal itself, an updated application to be loaded later into the storage medium can be personalized with the personalization data from the restore module. Keeping available the personalization data at the manufacturer or provider of the application, outside the storage medium and outside the terminal, is not required. In addition, the personalization of the updated application can be effected without a server-side connection being established. As a result, the administrative effort for the manufacturer or provider of the application is decreased. In addition, the costs for the later loading of the updated application are reduced, since only the application has to be transmitted via the server-side connection, but not the personalization data. The cost savings will be of benefit to both the manufacturer or provider of the application and the user of the storage medium. In addition, later updates of applications are particularly secure, because there are not transmitted any personalization data via the server-side connection.

Thus, with the invention, an efficient, cost effective and secure method for loading an application requiring personalization into a portable storage medium is created.

In a method according to the invention for operating a portable storage medium in a terminal, the portable storage medium contains an application which has been loaded into the portable storage medium according to the invention as described above. The application stored in the application memory and personalized generates application data during the operation of the storage medium, by which data the stored and personalized application is changed, or the application receives such application data from outside the storage medium. The application data are loaded, according to the invention, completely or at least partly into the restore module. Upon a later application update, changes which were made to the application originally stored in the application memory can be transmitted into the updated application by the application data, which were loaded from the original application into the restore module, being loaded from the restore module into the updated application.

As application data which are generated by the application there are provided for example the contents or counter readings of log files or counters, which are changed upon the execution of the application. As application data which are loaded from outside the storage medium into the application and received by the application, there are provided, for example in the case of a pay TV card, reception authorizations for receiving data contents (e.g. TV programs). Such reception authorizations change at regular or irregular time intervals, at the instigation of the card holder or of the data provider. Alternatively, as application data there are provided other data generated or received in the application during the operation of the storage medium, which effect that the application is changed.

The application is loaded selectively completely via the server-side connection from the server directly into the application memory within the storage medium. Selectively, when the application is loaded only partly via the server-side connection, the application for example is loaded via the server-side connection into the terminal and then is loaded via an external connection between the terminal and the storage medium (hereinbelow referred to as external connection, in contrast to an internal connection within the storage medium) from the terminal into the storage medium.

The application is personalized with the personalization data selectively outside the application memory or within the application memory. For a personalization outside the application memory, which is illustrated in FIG. 1, selectively first the personalization data are loaded into the application and the application is thus personalized with the personalization data, and then the personalized application is loaded into the application memory. For a personalization within the application memory, which is illustrated in FIG. 2 and FIG. 3, the unpersonalized application, i.e. requiring personalization, first is loaded into the application memory. Then the personalization data are loaded into the application already present in the application memory, so that the application is personalized with the personalization data within the application memory. The personalization data are stored here selectively first in the application memory and then stored from the application memory into the restore module (FIG. 2) or are first stored in the restore module and then stored from the restore module into the application memory (FIG. 3).

In the event that the application is personalized outside the application memory, the application is personalized selectively already in the server at the manufacturer or provider of the application. Therefore, via the server-side connection there is transmitted the personalized application. Alternatively, the application is personalized within the terminal, but outside the storage medium, and the personalized application is loaded via the external connection from the terminal into the storage medium, more precise into the application memory. In this variant, the personalization data and the unpersonalized application are transmitted via the server-side connection.

The application loaded into the application memory, in case of need, is installed in the application memory. In case of need, the personalization data are loaded into the installed application.

Selectively, the application is a Java card application or a Java card apple according to the specification of the Java card virtual machine (JCVM Spec e.g. version 2.0, 2.2, 2.2.1, 2.2.2, 3.0). In this case the application and the personalization data are selectively loaded in a common packet into the terminal or into the storage medium. The packet is for example a Java card CAP file, selectively stored in a Java card JAR file. The personalization data are contained selectively in a "custom component" (JCVM Spec 3.0, chapter 6.1.2) of a CAP file or JAR file. The custom component, completely or at least partly, is stored according to the invention in the restore module. An updated application loaded later can be personalized with the custom component of the restore module.

The invention further provides a method for updating a personalized application stored in a portable storage medium which is set up to be operated in a terminal, by loading an updated application, by which the stored application is to be replaced, and by loading personalization data for personalizing the updated application, wherein the updated application is made available in a server disposed outside a storage medium and outside the terminal, said server being connectible with the portable storage medium and/or the terminal via a server-side connection for a transmission of updated applications, the updated application is loaded into an application memory of the storage medium, which is carried out at least partly via the server-side connection, and the personalization data are loaded from a restore module into the updated application in such a way that the updated application is personalized with the personalization data, the restore module being independent of applications and/or updated applications stored in the application memory, is configured as a non-volatile memory, and is disposed within the portable storage medium or within the terminal.

The personalization of the updated application is effected with the personalization data stored in the restore module, and without a server-side connection being established. Therefore, there is neither required that the personalization data are kept available at the manufacturer or provider of the updated application nor required a server-side connection. Transmissions of the personalization data for personalizing the updated application are effected exclusively within the closed system of the portable storage medium and the terminal, but not via server-side connections. Therefore, the method according to the invention for updating an application is particularly cost effective and particularly secure.

The application, which is to be replaced by the updated application, has been loaded for example according to the method according to the invention for loading an application into the storage medium, the personalization data also having been loaded into the restore module.

Selectively, upon the method for updating an application, the application stored in the application memory (and possibly installed) and personalized, which is to be replaced, has generated application data during a preceding operation of the storage medium, by which data the stored and personalized application has been changed. The application data have been loaded completely or at least partly into the restore module. Upon the updating of the application by loading the updated application, the application data, which have been loaded from the original application into the restore module, are loaded from the restore module into the updated application, in such a way that the updated application is changed with the application data. In this way, changes which have been made to the application originally stored in the application memory are transmitted to the updated application.

Selectively, the application is deleted from the application memory. Selectively, the application is deleted after the updated application has been loaded into the application memory. Selectively, the application is overwritten with the updated application.

The variant of the invention in which application data, too, are stored in the restore module and are loaded into the updated application has the additional advantage that application data, which could get lost in particular upon a deletion of the original application, are retained for the updated application.

The updated application is loaded selectively completely via the server-side connection from the server directly into the application memory within the storage medium. Selectively, when the updated application is loaded only partly via the server-side connection, the updated application for example is loaded via the server-side connection into the terminal and then is loaded via an external connection between the terminal and the storage medium into the storage medium.

The updated application is personalized with the personalization data selectively within the application memory (shown by way of example in FIGS. 4 and 5) or outside the application memory, e.g. within the terminal (shown by way of example in FIGS. 6 and 7). The updated application, however, is always personalized here with personalization data from the restore module, and without a server-side connection being established.

Selectively, the server-side connection is configured as a radio connection (OTA, "over the air "), in particular as a mobile phone connection.

Selectively, the restore module is disposed within the storage medium. This variant has the additional advantage that the restore module is provided independently of the terminal used and organizationally closely adjacent to the application memory. In this way, the restore module can be easier protected against unauthorized access to its memory contents than outside the storage medium.

The restore module is selectively access-protected. The access protection is achieved selectively by an authentication requirement and/or an encrypted storage of the data in the restore module. Selectively, an access to personalization data stored in the restore module is made possible only on the occasion of an authorized loading of an application or updated application into the storage medium. For example, for loading an application or updated application there is required an authentication. The authentication for the loading of the application comprises selectively an authentication for accessing the personalization data in the restore module. Selectively, the personalization data are stored in the restore module in such a way that they are stored in encrypted form in the restore module.

A portable storage medium according to the invention is set up to carry out a method according to the invention and has an application memory which is set up to store applications, as well as a restore module which is configured as a non-volatile memory and which is independent of the applications stored in the application memory. The restore module is set up to keep available personalization data in the application memory for the personalization of applications or updated applications, so that a personalization of (updated) applications is possible without keeping available the personalization data at the manufacturer or provider of the application and without a server-side connection.

The portable storage medium is selectively provided with a microprocessor. Selectively, the storage medium is a Java card. The application is selectively configured as a Java card application or Java card applet. Selectively, the storage medium is configured as a pay TV card for using pay TV or is integrated in such a pay TV card. Selectively, the storage medium is configured as a smart card having a security module for using a terminal in a mobile phone network, e.g. (U)SIM card, or is integrated in such a smart card (e.g. (U)SIM card). Selectively, the storage medium is configured as a secure flash card having a controller and a flash memory, or is integrated in such a secure flash card.

As a terminal there is provided for example a mobile terminal such as e.g. mobile phone, PDA, smart phone or the like, a set top box for pay TV or a controller of a secure flash card.

The restore module and the application memory can be brought in a data exchange connection with each other preferably via an internal connection. The storage medium, in particular the restore module and the application memory,

[sic] can be brought in a data exchange connection with each other preferably via one or more external connections. The one or more external connections can in particular be connections according to ISO/IEC 7816-3&4.

A system according to the invention with a portable storage medium and a terminal for operating the storage medium is set up to carry out a method according to the invention. The system has in the storage medium an application memory which is set up to store applications. The system further has in the storage medium or in the terminal a restore module which is configured as a non-volatile memory, and which is independent of applications stored in the application memory. The portable storage medium further is selectively configured as described above.

The restore module is selectively configured as an application, for example as a Java card application or as a Java card applet, selectively as a group of several cooperating applications, selectively as a library, e.g. as a Java card library, or as a group of cooperating libraries.

A personalization in the context of the invention can selectively be a personalization prior to the issuance of the storage medium by the manufacturer ("pre-issuance"), or a personalization after the issuance of the storage medium by the manufacturer of the storage medium ("post-issuance"). A post-issuance personalization is carried out for example by a provider of applications different than the manufacturer of the storage medium.

The loading of personalization data from the restore module and into the restore module is carried out selectively at the instigation of an application personalized or to be personalized, or at the instigation of the restore module, or at the instigation of a third instance different than the application to be personalized and the restore module. This third instance is selectively configured as a further application.

An application or updated application loaded into the application memory, in case of need, is installed in the application memory. In case of need, the personalization data are loaded into the installed application or updated application.

DESCRIPTION OF THE DRAWINGS

In the following, the invention is explained in more detail on the basis of exemplary embodiments and with reference to the Figure.

DETAILED DESCRIPTION OF PREFERRED EMBODIMENTS OF THE INVENTION

Figure 9:
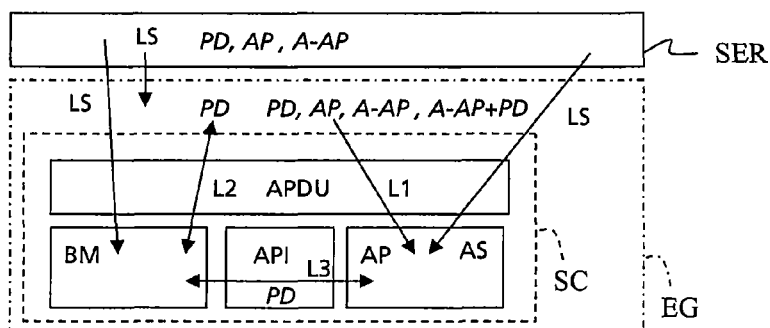
FIG. 9 shows a schematic representation of the structure of a portable storage medium, according to an embodiment of the invention.

FIGS. 1 to 4 illustrate four embodiments of the loading of an application AP requiring personalization into a smart card SC (portable storage medium) which is operated in a terminal EG. The loading of the application AP into the smart card SC is not shown, only the loading of the personalization data PD for personalizing the application AP. With arrows having lettering Lx, x=1, 2, 3, S there are represented connections for the transmission of data, which are also shown in FIG. 9.

Figure 1:
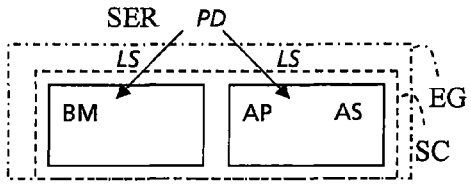
FIG. 1 shows a diagram illustrating the loading of an application requiring personalization, according to a first embodiment of the invention.

In a first embodiment according to FIG. 1, there are stored personalization data PD for personalizing the application AP from a server SER outside the smart card SC and outside the terminal EG, via a server-side connection LS, into the application AP stored in the application memory AS, on the one hand, so that the application AP is personalized, and into a restore module (backup module) BM, on the other hand, and thus kept available for later personalizations of updated applications loaded later.

Figure 2:
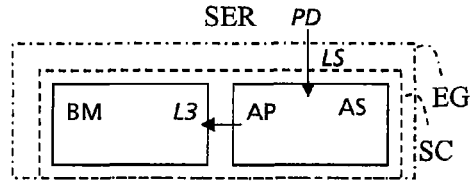
FIG. 2 shows the loading of an application requiring personalization, according to a second embodiment of the invention.

In a second embodiment according to FIG. 2, there are stored personalization data PD for personalizing the application AP from a server SER outside the smart card SC and outside the terminal EG via a server-side connection LS into the application AP stored in the application memory AS, so that the application AP is personalized. The personalization data PD are stored from the application memory AS via an internal connection L3 into the restore module (backup module) BM.

Figure 3:
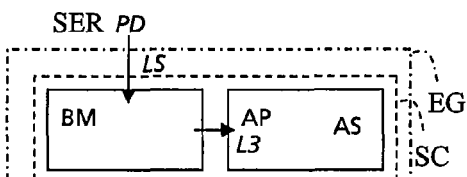
FIG. 3 shows the loading of an application requiring personalization, according to a third embodiment of the invention.

In a third embodiment according to FIG. 3, in contrast to the one of FIG. 2, there are first stored the personalization data PD from a server SER outside the smart card SC and outside the terminal EG via a server-side connection LS into the restore module BM and then from the restore module BM via an internal connection L3 into the application AP stored in the application memory AS, so that the application AP is personalized.

Figure 4:
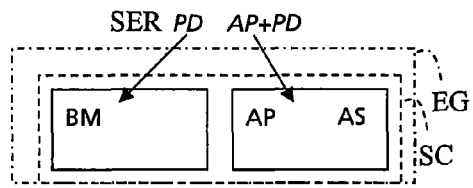
FIG. 4 shows the loading of an application requiring personalization, according to a fourth embodiment of the invention.

In a fourth embodiment according to FIG. 4, the application AP is personalized at the server SER outside the smart card SC and outside the terminal EG. Via a server-side connection LS there are loaded the personalization data into the restore module BM and the personalized application into the application memory AS.

In the embodiments of FIGS. 1 to 4, the server-side connection LS, deviating from the representations in FIGS. 1 to 4, may lead from the server SER selectively only to the terminal EG, and the further connection to the smart card SC be formed by an external connection L1 or L2, as the one shown in FIG. 9.

FIGS. 5 to 8 illustrate the loading of an updated application A-AP into a smart card SC (portable storage medium) which is operated in a terminal EG. Arrows Lx indicate connections (see also FIG. 9).

Figure 5:
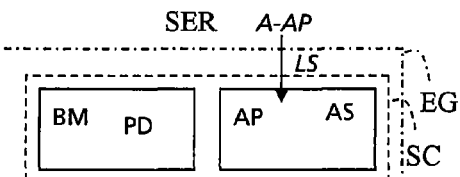
FIG. 5 shows the loading of an updated application, according to a first embodiment of the invention.
Figure 6:
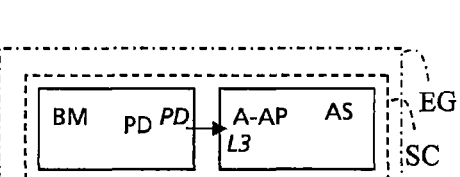
FIG. 6 shows the loading of the personalization data upon the method of FIG. 5.

In a first embodiment of loading an updated application A-AP, represented in FIGS. 5 and 6, the updated application A-AP is loaded via a server-side connection LS in an unpersonalized form into the application memory AS of the smart card SC (FIG. 5). Then, personalization data PD—and possibly application data AD—, which have been loaded for example according to any of FIGS. 1 to 4 into the restore module (backup module) BM, are loaded via an internal connection L3 from the restore module BM into the updated application A-AP, so that the updated application A-AP is personalized (FIG. 6).

Figure 7:
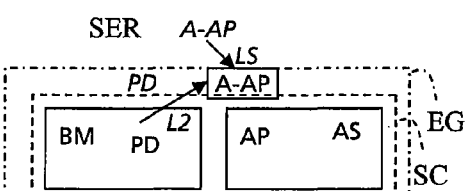
FIG. 7 shows the loading of personalization data into an updated application, according to a second embodiment of the invention.
Figure 8:
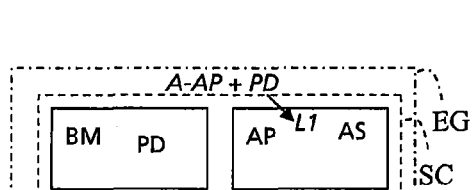
FIG. 8 shows the loading of the personalized updated application upon the method of FIG. 7.

In a second embodiment of loading an updated application A-AP, represented in FIGS. 7 and 8, the updated application A-AP in an unpersonalized form is loaded from the server SER via a server-side connection LS into the terminal EG. The personalization data PD, and possibly application data AD, are loaded via an external link L2 from the restore module BM into the updated application A-AP kept available in the terminal EG, so that the updated application A-AP is personalized outside the smart card SC and at the same time within the terminal EG (FIG. 7). Then the personalized updated application A-AP+PD (+AD) is loaded via an external connection L1 into the application memory AS of the smart card SC (FIG. 8).

FIG. 9 shows schematically the structure of a smart card SC, according to an embodiment of the invention. The smart card is configured as a Java card. The smart card SC is operated in a terminal EG. The restore module BM and the application memory AS are coupled via an internal interface API, e.g. an application programming interface (API), via which an internal connection L3 can be established (arrow L3). The restore module BM and the application memory AS are coupled via an external interface APDU, e.g. an APDU interface, with an external terminal, via which the external connections L2 and L1 can be established. Via the internal interface API in the internal connection L3 there can be transmitted personalization data PD, and possibly application data AD, selectively from the restore module BM into the application memory AS or from the application memory AS into the restore module BM. Via the external interface APDU there can be loaded via the first external connection L1 e.g. personalization data PD, applications AP, updated applications A-AP, personalized updated applications from the terminal EG of the smart card AC into the application memory AS. Via a second external connection L2 of the external interface APDU there can be transmitted personalization data from the terminal EG into the restore module BM and vice versa transmitted from the restore module BM out of the smart card SC. Connections to the server SER are established via server-side connections LS (arrows LS), which can be established between the server SER, on the one hand, and the terminal EG, the restore module BM or the application memory AS, on the other hand.

Figure 10:
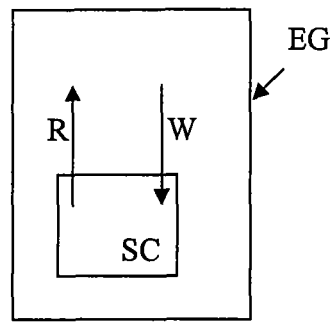
FIG. 10 shows a schematic representation of a portable storage medium in cooperation with a terminal, according to an embodiment of the invention.
Figure 11:
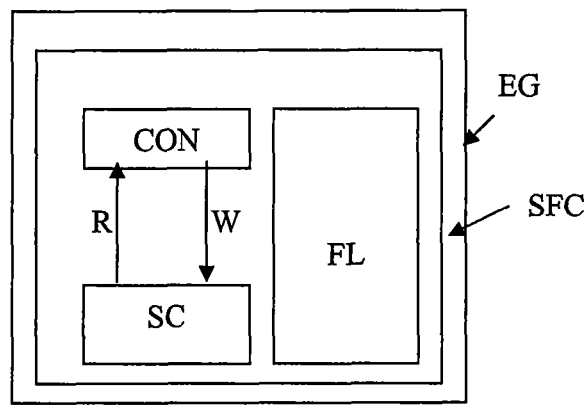
FIG. 11 shows a schematic representation of a portable storage medium in cooperation with a terminal, according to a further embodiment of the invention.
Figure 12:
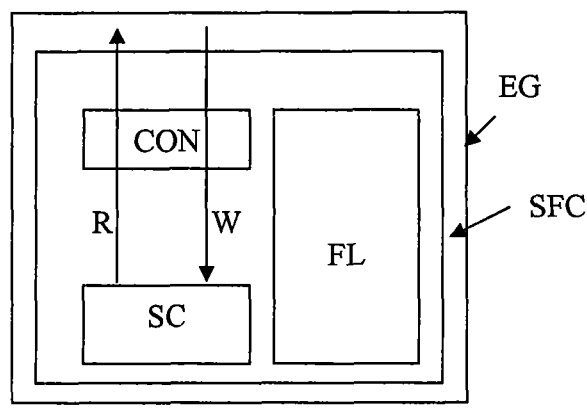
FIG. 12 shows a schematic representation of a portable storage medium in cooperation with a terminal, according to a further embodiment of the invention.

FIGS. 10 to 12 show, in a schematic representation, portable storage media SC in cooperation with terminals EG, according to embodiments of the invention. The portable storage medium SC, provided with an application memory AS and a restore module BM, is configured as a smart card SC and for example built-up as represented in FIGS. 1 to 9.

FIG. 10 shows a smart card SC, which is inserted into a terminal EG, a reading of data from the smart card SC (arrow R) and a writing of data into the smart card SC (arrow W) being controlled by the terminal EG. The terminal in FIG. 10 is for example a mobile phone or a similar mobile terminal or a pay TV set top box. The smart card SC correspondingly is for example a (U)SIM card or pay TV card. The loading of personalization data PD according to the invention from the restore module BM into an updated application A-AP, e.g. according to FIG. 6 or 7, in the case of the configuration of FIG. 10 is controlled by the terminal EG.

FIG. 11 shows a smart card SC integrated in a secure flash card SFC. The secure flash card SFC has further a controller CON and a flash memory FL and is inserted into a terminal EG. The application memory AS for applications AP and updated applications A-AP and the restore module BM are disposed within the smart card SC. A reading of data from the smart card SC (arrow R) and a writing of data into the smart card SC (arrow W), in the case of the configuration of FIG. 11, is controlled by the controller CON of the secure flash card SFC. The loading of personalization data PD—and possibly application data AD—according to the invention from the restore module BM into an updated application A-AP, e.g. according to FIG. 6 or 7, in the case of the configuration of 11, is controlled by the controller CON of the secure flash card SFC.

FIG. 12 shows a configuration similar to FIG. 11, with the difference that a reading of data from the smart card SC (arrow R) and a writing of data into the smart card SC (arrow W), e.g. loading personalization data PD and possibly application data AD from the restore module BM into an updated application A-AP, is not controlled by the controller CON of the secure flash card SFC, but by the terminal.

The invention claimed is:

1. A method for loading an application into a portable storage medium, the method comprising:
   storing a portion of personalization data required by the application in a restore module of the portable storage medium, the restore module being a non-volatile memory that is independent of applications stored in the portable storage medium;
   making available in a server the application, the server being disposed outside the portable storage medium, and the server being connectible with the portable storage medium via a server-side connection;
   loading the application at least partly via the server-side connection into an application memory of the portable storage medium; and
   loading the personalization data on the storage medium into the application in such a way that the application is personalized with the personalization data; and
   wherein the portion of personalization data is stored in the restore module before the application is at least partly loaded into the application memory.

2. The method according to claim 1, wherein the portable storage medium is configured for operation with a terminal, and
   wherein the server is connectible with the terminal via the server-side connection.

3. A method for operating, in a terminal, a portable storage medium having an application which has been loaded into the portable storage medium according to the method of claim 1, comprising the steps:
   generating or receiving, via the application stored and personalized in the first memory, application data during the operation of the portable storage medium, by which the stored and personalized application is changed, and
   loading the application data at least partly into the restore module of the second memory.

4. The method according to claim 1, wherein the server-side connection is configured as a radio connection.

5. The method according to claim 1, wherein the restore module of the second memory is access-protected and an access to personalization data stored in the restore module is made possible only on the occasion of an authorized loading of an application or updated application into the portable storage medium.

6. A portable storage medium set up to carry out a method according to claim 1, comprising:
   an application memory set up to store applications,
   a restore module which is configured as a non-volatile memory and which is independent of applications stored in the application memory.

7. The portable storage medium according to claim 6, wherein the storage medium is provided with a microprocessor.

8. The portable storage medium according to claim 6, wherein the application are configured as a Java card application or Java card applet.

9. The portable storage medium according to claim 6, wherein the storage medium is configured as a pay TV card for the use of pay TV or is integrated in such a pay TV card.

10. The portable storage medium according to claim 6, wherein the storage medium is configured as a smart card having a security module for using a terminal in a mobile phone network or is integrated in such a smart card.

11. The portable storage medium according to claim 6, wherein the storage medium is configured as a secure flash card or is integrated in such a secure flash card.

12. A system having a portable storage medium and a terminal for operating the storage medium set up to carry out a method according to claim 1, the system comprising:
   an application memory set up in the portable storage medium to store applications,
   a restore module in the portable storage medium which is configured as a non-volatile memory, and which is independent of the applications stored in the application memory.

13. The system according to claim 12, wherein the portable storage medium includes,
   an application memory set up to store applications, and
   a restore module which is configured as a non-volatile memory and which is independent of the applications stored in the application memory.

14. A method for updating an application stored in a portable storage medium, the method comprising:
   storing a portion of personalization data required in a restore module of the portable storage medium, the restore module being a non-volatile memory that is independent of applications and updated applications stored in the portable storage medium;
   making available an updated application in a server disposed outside the portable storage medium, the server being disposed outside the portable storage medium, and the server being connectible with the portable storage medium via a server-side connection;
   loading the updated application at least partly via the server-side connection into an application memory of the portable storage medium, and
   loading the portion of personalization data on the storage medium from a second memory into the updated application in such a way that the updated application is personalized with the personalization data,
   wherein the portion of personalization data is stored in the restore module before the updated application is at least partly loaded into the application memory.

15. The method according to claim 14, wherein the portable storage medium is configured for operation with a terminal, and
   wherein the server is connectible with the terminal via the server-side connection.

16. The method according to claim 14, wherein the application stored and personalized in the application memory has generated or received application data during a preceding operation of the storage medium, by which the stored and personalized application has been changed, and the application data have been loaded at least partly into the restore module, wherein the application data are loaded from the restore module into the updated application in such a way that the updated application is changed with the application data.

17. The method according to claim 14, wherein the application is deleted from the application memory.

* * * * *